Nov. 27, 1934.   O. V. STRAND   1,982,084
FISH SCALING DEVICE
Filed Feb. 3, 1932
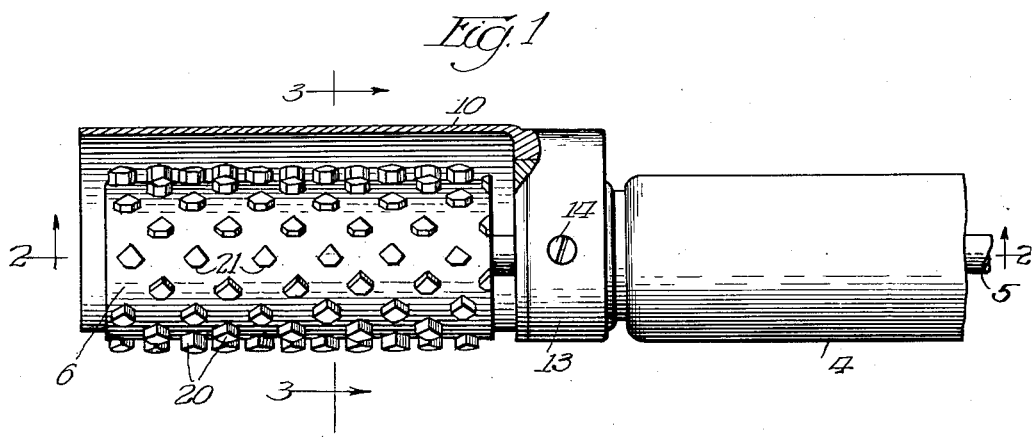
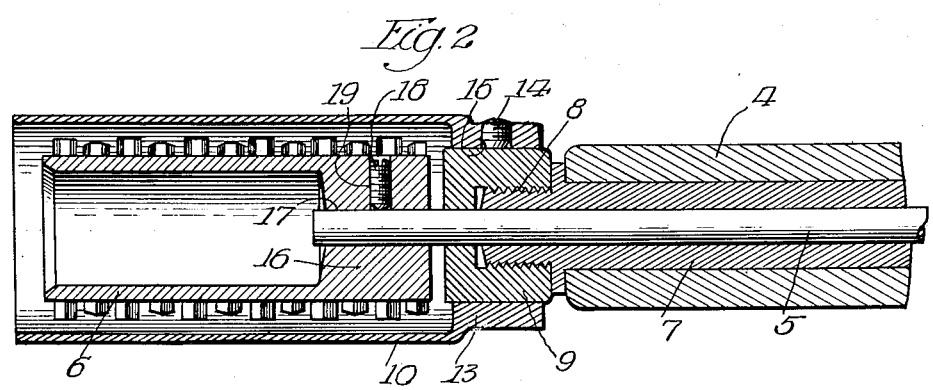
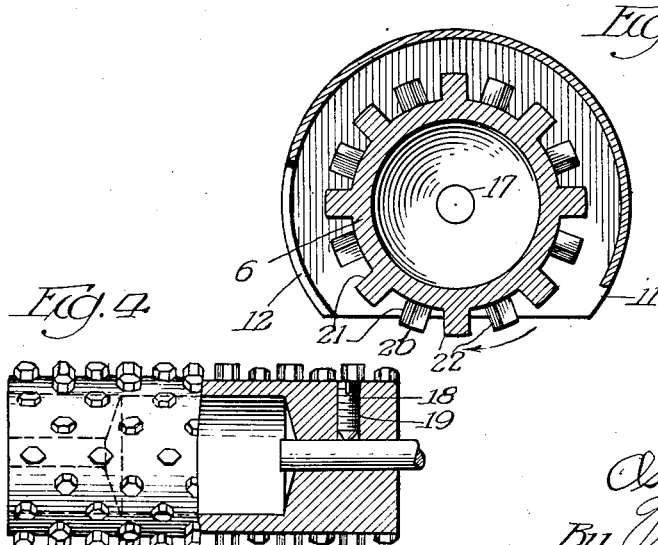

Patented Nov. 27, 1934

1,982,084

UNITED STATES PATENT OFFICE 1,982,084

FISH SCALING DEVICE

Oscar V. Strand, Evanston, Ill.

Application February 3, 1932, Serial No. 590,585

6 Claims. (Cl. 17—5)

The present invention relates generally to devices for scaling fish. More particularly the invention relates to that type of fish scaling device which is designed to be manipulated manually and comprises (1) a tubular handle; (2) a shaft which extends longitudinally through, and is journalled in, a bushing in the handle and is adapted to be driven from an electric motor or like source of power by means of a flexible shaft; and (3) a cylindrical rotor which is secured fixedly to one end of the shaft and embodies radially extending projections on the periphery thereof for effecting scaling of the fish upon drive of the shaft by the motor.

One object of the invention is to provide a fish scaling device of this type in which the radially extending projections on the periphery of the rotor are of such design and construction that they cannot injure the user's hands when brought into contact therewith, and serve to effect a quick and efficient scaling of a fish without tearing, gouging or abrading in any way the flesh of the fish. In general, these projections on the rotor are polygonal in conformation and have the leading portions thereof cut away to form flat faces which are adapted, when the rotor is brought into contact with the fish scales, to scrape the scales off the skin of the fish to which the device is applied.

Another object of the invention is to provide a fish scaling device of the type under consideration which is generally of new and improved construction, may be manufactured at a low and reasonable cost and is safer and more efficient in operation than previously designed devices of the same general character.

Other objects of the invention and the various advantages and characteristics of the present construction will be apparent from a consideration of the following detailed description.

The invention consists in the several novel features which are hereinafter set forth and are more particularly defined by the claims at the conclusion hereof.

In the drawing which accompanies and forms a part of this specification or disclosure and in which like numerals of reference denote corresponding parts throughout the several views:

Figure 1 is a view, partly in side elevation and partly in section, of a fish scaling device embodying the invention;

Figure 2 is a longitudinal section taken on the line 2—2 of Figure 1, and illustrating in detail the construction of the rotor and the manner in which the rotor is connected to the shaft;

Figure 3 is an enlarged transverse sectional view taken on the line 3—3 of Figure 1; and Figure 4 is a view of a modified form of rotor, parts being shown in sections and parts being shown in elevations.

The device which is shown in Figures 1, 2 and 3 of the drawing is designed for use in connection with the scaling of fish and comprises a handle 4, a shaft 5 and a metallic, hollow, cylindrical rotor 6. The handle 4 is of tubular construction and fits around an elongated bushing 7. The latter is secured against rotation relatively to the handle in any suitable manner, and is provided at one end thereof with an externally threaded stem 8. A nut 9 is connected to the stem and supports a substantially cylindrical guard 10. This guard is provided with a pair of laterally spaced, longitudinally extending slots 11 and 12 and embodies at one end thereof an integral collar 13. The latter fits around the nut 9 and is secured in place by means of a set screw 14 which passes through a transverse hole 15 in the collar and bears against the periphery of the nut.

The shaft 5 extends through and is journalled in the bushing 7 and is arranged so that one end thereof extends through a central hole or opening in the nut 9 and projects into the space within the guard 10. The other end of the shaft is adapted to be connected by a flexible shaft (not shown) to a motor or like source of power for driving purposes.

The rotor 6 is disposed within and longitudinally of the casing 10 and embodies at one end thereof a cross wall 16. It is coaxially positioned with respect to the shaft 5 and is adapted to be brought into contact with a fish by way of the slot 11 in the guard 10. The cross wall 16 embodies a central bore 17 through which extends the end of the shaft 5 that projects into the guard. The rotor is connected fixedly to the shaft 5 by means of a set screw 18. The latter extends through a transverse opening 19 in the cross wall 16 and engages the shaft.

In addition to the cross wall 16, the rotor 6 comprises a plurality of projections 20. The latter are formed integrally with, and project outwardly from, the outer periphery of the rotor and are adapted, upon application of the device to a fish, to scrape or strip the scales from the skin of the fish.

In order to prevent damage to the user's hands and to effect an efficient scaling without tearing, gouging or abrading in any way the skin or flesh of the fish to which the device is applied, the projections 20 are polygonal in form and are arranged so that certain of the corners thereof extend lengthwise and transversely of the rotor. The leading portions of the projections, that is, the portions which face in the direction of rotation and first engage the fish scales, are cut away so as to form flat rectangular faces 21 which extend parallel with the axis of the rotor. These faces 21 are adapted, during rotation of the rotor by drive of the shaft 5, to slap against the scales of the fish to which the device is applied and to scrape or strip them loose from the skin of the fish. They are substantially radial with respect to the axis of the rotor and form with the top faces of the projections comparatively blunt edges 22. The latter, by virtue of their bluntness, scrap the skin of the fish but do not tear, gouge or abrade it in any manner. The projections 20 are preferably arranged in rows which extend lengthwise of the rotor and the projections of each row are preferably staggered with respect to the projections of the contiguous rows. The faces of the projections which adjoin and are at the sides of the faces 21 extend rearwardly and outwardly with respect to the latter and operate, during rotation of the rotor, to produce a wedge action which tends to force the scales laterally to a certain extent and thus loosen them from the skin of the fish.

In scaling a fish with the device, the rotor is brought into direct contact with the scales of the fish by pushing the guard 10 of the device so that the slot 11 faces the fish. After so positioning the guard, the device is moved back and forth lengthwise of the fish and operates to effect a complete scaling as the result of the projections 20 being brought in rapid succession against the scales. During rotation of the rotor, the faces 21 of the projections slap against and loosen the scales, and the angled faces adjoining the faces 21 wedge the scales loose from the skin of the fish. As the device is moved lengthwise of the fish, the scales which are knocked loose by the projections 20 are discharged through the slot 12, which serves as an outlet. In the event that the user of the device should inadvertently bring the rotor into contact with the hands or other parts of the body, no injury occurs for the reason that the projections 20 present no sharp edges or corners.

The fish scaling device herein described is exceedingly simple, as far as construction is concerned, and is safe to use, as well as efficient in operation, as the result of the specific construction and formation of the projections 20 on the rotor 6.

The rotor which is shown in Figure 4 of the drawing is the same as that exhibited in Figures 1, 2 and 3 of the drawing, except that it embodies two cross walls at its ends and the projections have the leading and trailing portions cut away. As a result of this arrangement, it is possible to reverse the rotor when the edges at one side of the projections become dull.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. As a new article of manufacture, a rotor for a power driven fish scaling device, comprising a cylindrical body having means whereby it may be connected to a source of power for drive about its axis and embodying on its periphery a plurality of radially extending, rigid projections, said projections being provided at the leading portions thereof with substantially flat faces for scraping the scales off of the fish during drive of the rotor and embodying rearwardly and outwardly extending faces at the sides of the aforesaid faces for assisting the latter in scraping off the scales and wedging the scales sidewise.

2. As a new article of manufacture, a rotor for a power driven fish scaling device, comprising a cylindrical body having means whereby it may be connected to a source of power for drive about its axis and embodying on the periphery thereof a plurality of rigid radially extending projections, said projections being provided with corners extending lengthwise of the rotor and said projections having the leading portions thereof cut away so as to form substantially flat faces for scraping the scales off the fish during drive of the rotor.

3. As a new article of manufacture, a rotor for a power driven fish scaling device, comprising a cylindrical body having means at one end thereof, whereby it may be connected for drive from a source of power and embodying on its periphery a plurality of equidistantly spaced, longitudinal rows of rigid radially extending polygonal projections, said projections being arranged so that certain of the corners extend lengthwise and transversely of the body and having the leading portions thereof cut away so as to form substantially flat faces for scraping the scales off the fish during drive of the rotor.

4. As a new article of manufacture, a rotor for a power driven fish scaling device, comprising a cylindrical body having means at one end thereof whereby it may be connected to a unidirectional source of power for drive about its axis in one direction and having means at its other end whereby when it is reversed end for end it may be connected to the same source of power for drive in the same direction and embodying a plurality of rigid, radially extending projections on the periphery thereof, said projections being provided at one side thereof with substantially flat faces for scraping the scales off the fish during drive of the rotor while it is connected to the source of power by way of said first mentioned means, and embodying flat faces at the opposite side thereof for scale scraping purposes when the rotor is reversed end for end and is connected for drive by said source of power through the medium of the second mentioned means.

5. As a new article of manufacture, a rotor for a power driven fish scaling device, comprising a cylindrical body having means at one end thereof whereby it may be connected to a unidirectional source of power for drive about its axis in one direction and having means at its other end whereby when it is reversed end for end it may be connected to the same source of power for drive in the opposite direction, and embodying a plurality of rigid, radially extending, polygonal projections on the periphery thereof, said projections being arranged so that certain of the corners thereof extend lengthwise of the rotor and having the leading and trailing portions thereof cut away to form substantially flat faces on either side of the projections for scraping the scales off the fish during drive of the rotor while it is connected to said source of power by either of the aforesaid means.

6. As a new article of manufacture, a rotor for a power driven fish scaling device, comprising a cylindrical body having means whereby it may be connected to a source of power for drive about its axis and embodying on the periphery thereof a plurality of rigid, radially extending projections, said projections being provided at one side thereof with substantially flat faces for scraping the scales off the fish during drive of the rotor, and rearwardly and outwardly extending flat faces at the sides of the aforesaid faces for assisting the latter in scraping off the scales and wedging the scales sidewise, and being also provided at the opposite side with similar faces for scale scraping and wedging purposes.

OSCAR V. STRAND.